US011192489B2

(12) United States Patent
Dworkin

(10) Patent No.: US 11,192,489 B2
(45) Date of Patent: Dec. 7, 2021

(54) SLIDING STRUCTURE

(71) Applicant: DRDesigns, LLC, Incline Village, NV (US)

(72) Inventor: Darryl R. Dworkin, Incline Village, NV (US)

(73) Assignee: DRDesigns, LLC, Incline Village, NV (US)

(*) Notice: Subject to any disclaimer, the term of this patent is extended or adjusted under 35 U.S.C. 154(b) by 0 days.

(21) Appl. No.: 16/994,074

(22) Filed: Aug. 14, 2020

(65) Prior Publication Data

US 2020/0369192 A1 Nov. 26, 2020

Related U.S. Application Data

(60) Provisional application No. 62/977,848, filed on Feb. 18, 2020.

(51) Int. Cl.

| B60P 3/10 | (2006.01) |
| B65G 13/00 | (2006.01) |
| B65G 39/00 | (2006.01) |
| B65G 1/02 | (2006.01) |
| B65G 39/02 | (2006.01) |
| A47B 81/00 | (2006.01) |

(52) U.S. Cl.
CPC ............ B60P 3/1025 (2013.01); A47B 81/00 (2013.01); B65G 1/023 (2013.01); B65G 39/025 (2013.01)

(58) Field of Classification Search
CPC ..... B60R 9/08; B60R 9/42; B60R 9/45; B60P 3/1008; B60P 3/1025; B60P 3/1066; A47B 81/00; B65G 39/025
See application file for complete search history.

(56) References Cited

U.S. PATENT DOCUMENTS

| 2,554,398 A | * | 5/1951 | Brei ........................ B63C 3/02 193/42 |
| 3,117,683 A | * | 1/1964 | Kleppe ................ B60P 3/1066 414/534 |
| 3,567,035 A | * | 3/1971 | Dudzik ................. A47B 57/06 211/13.1 |
| 3,579,996 A | * | 5/1971 | Edson ..................... B63C 5/02 405/1 |
| 3,976,177 A | * | 8/1976 | Brown ................ B65G 39/025 193/37 |
| 4,018,322 A | * | 4/1977 | Brown ................... B60B 33/08 193/37 |

(Continued)

FOREIGN PATENT DOCUMENTS

| GB | 1266884 A | * | 3/1972 | ........... B65G 39/025 |
| WO | WO-2020057783 A1 | * | 3/2020 | ............. B60B 33/08 |

Primary Examiner — Kimberley S Wright
(74) Attorney, Agent, or Firm — Jeffrey G. Sheldon; Katherine B. Sales; Cislo & Thomas LLP

(57) ABSTRACT

A support for a vessel such as a kayak or canoe comprises a support structure such as a kayak rack supported by the ground, the support structure comprising a beam for supporting the vessel, the beam generally parallel to the ground. A sliding structure is on the beam. The sliding structure comprises a bracket having an upwardly facing surface; and roller bearings on the upwardly facing surface of the bracket for ease in slidingly placing and removing the vessel from the support structure. A fastener fastens the sliding structure to the beam.

10 Claims, 3 Drawing Sheets

(56) References Cited

U.S. PATENT DOCUMENTS

| | | | | |
|---|---|---|---|---|
| 4,036,345 A * | 7/1977 | Webb | ............... | B60P 1/52 |
| | | | | 193/35 SS |
| 4,074,811 A * | 2/1978 | Filak | ............... | E04B 1/24 |
| | | | | 211/182 |
| 4,530,634 A * | 7/1985 | Johnson | ............... | F16B 9/054 |
| | | | | 414/534 |
| 4,960,356 A * | 10/1990 | Wrenn | ............... | B60P 3/1058 |
| | | | | 114/344 |
| 5,373,935 A * | 12/1994 | Anderson | ............... | B65G 39/12 |
| | | | | 198/808 |
| 5,810,546 A * | 9/1998 | Schmoling | ............... | B60P 3/1066 |
| | | | | 114/344 |
| 5,853,279 A * | 12/1998 | Neugebauer | ............... | B60P 3/122 |
| | | | | 414/462 |
| 5,957,350 A * | 9/1999 | Giles | ............... | B60R 9/042 |
| | | | | 224/310 |
| 9,238,551 B2 * | 1/2016 | Kalitta | ............... | B65G 39/12 |
| 2014/0326574 A1 * | 11/2014 | Kalitta | ............... | B64D 9/00 |
| | | | | 193/35 MD |
| 2018/0050862 A1 * | 2/2018 | Wu | ............... | B65D 88/542 |
| 2020/0406825 A1 * | 12/2020 | Wang | ............... | B60R 9/048 |

* cited by examiner

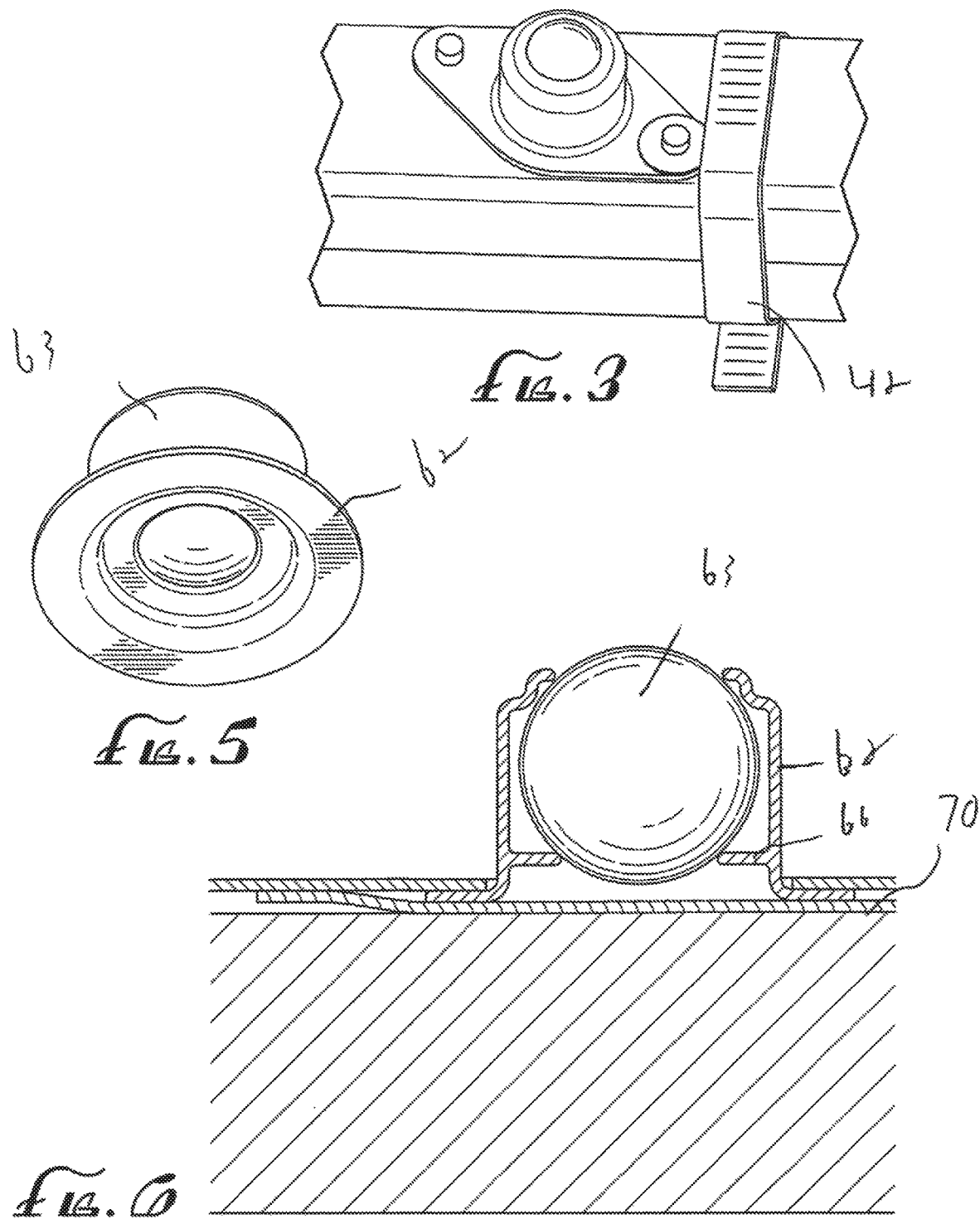

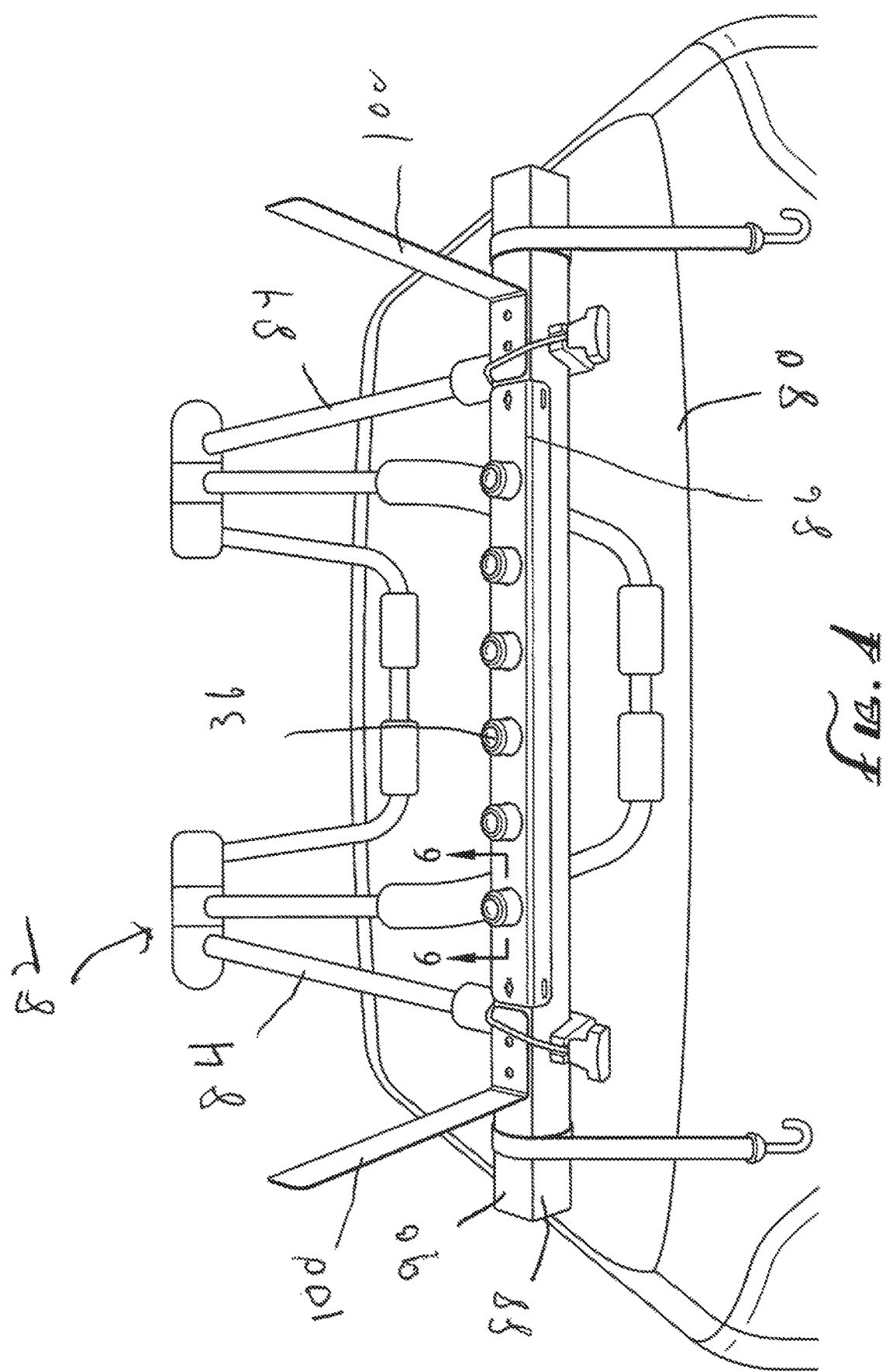

SLIDING STRUCTURE

CROSS-REFERENCE

This application claims the benefit of Provisional Application Ser. No. 62/977,848 filed on Feb. 18, 2020, which is incorporated herein by reference.

BACKGROUND

It is difficult to load and unload a vessel, such as a kayak, canoe, or sailboat, onto and off of a support structure, such as a kayak rack or a vehicle top. Moreover, when sliding the vessel into position, damage can occur to the vessel, such as scrapes and dents. For those with limited strength, it can be very difficult to handle the weight of such a vessel.

Therefore, there is a need for a system for use in loading and unloading such vessels.

SUMMARY

The present invention provides a system that satisfies this need. In one embodiment it is used on a support structure, such as a kayak rack with a beam for supporting the vessel, the beam generally parallel to the ground. A sliding structure is on the beam, the sliding structure comprising: (i) a bracket having an upwardly facing surface; (ii) roller bearings on the upwardly facing surface of the bracket for ease in slidingly placing and removing the vessel from the support structure; and (iii) a fastener fastening the sliding structure on the beam. "Slidingly" means "with a sliding motion."

Two sliding structures can be used, with one on each of two spaced apart beams. The support structure can be a vehicle roof rack. The fastener can be a hose clamp, tie-ties, clamps, or other holding devices. Alternatively, the bracket can have at least two openings therethrough and the fastener can comprise a screw or a bolt extending through each of the two openings into the first beam.

Preferably the bracket is an L bracket for versatility. The ball bearings can comprise a housing formed of metal or plastic containing a ball formed of metal, plastic or glass.

The bracket has a longitudinal axis and opposed ends. There can be an arm proximate to each end, each arm extending in a direction away from the longitudinal axis of the bracket for preventing a vessel from sliding off of the sliding structure.

Broadly the invention comprises a device useful for loading, unloading, or both loading and unloading an article onto a structure, the device comprising:

(i) a bracket having an upwardly facing surface;
(ii) roller bearings on the upwardly facing surface of the bracket; and
(iii) a fastener for fastening the bracket to the structure.

The invention also includes a method of loading a vessel onto a support structure or unloading a vessel from a support structure or both, the method composing the step of sliding the vessel on the roller bearings.

DRAWINGS

These and other features of the present invention will better be understood with regard to the following description, appended claims, and accompanying drawings where:

FIG. 3 is a close-up perspective view of a portion of the sliding structure of FIG. 2; and FIG. 4 is a schematic view showing the present invention in position for loading a vessel on a vehicle;

FIG. 5 is a perspective view of an optional ball bearing assembly for use with the structure of FIG. 2: and FIG. 6 is a front elevation view, partly in section, of an alternate ball bearing assembly for use with the sliding structure of FIG. 2.

DESCRIPTION

The present invention is directed to a support system for a vessel such as a kayak 12. The system comprises a support structure, a sliding structure and a fastener.

Figure 1:
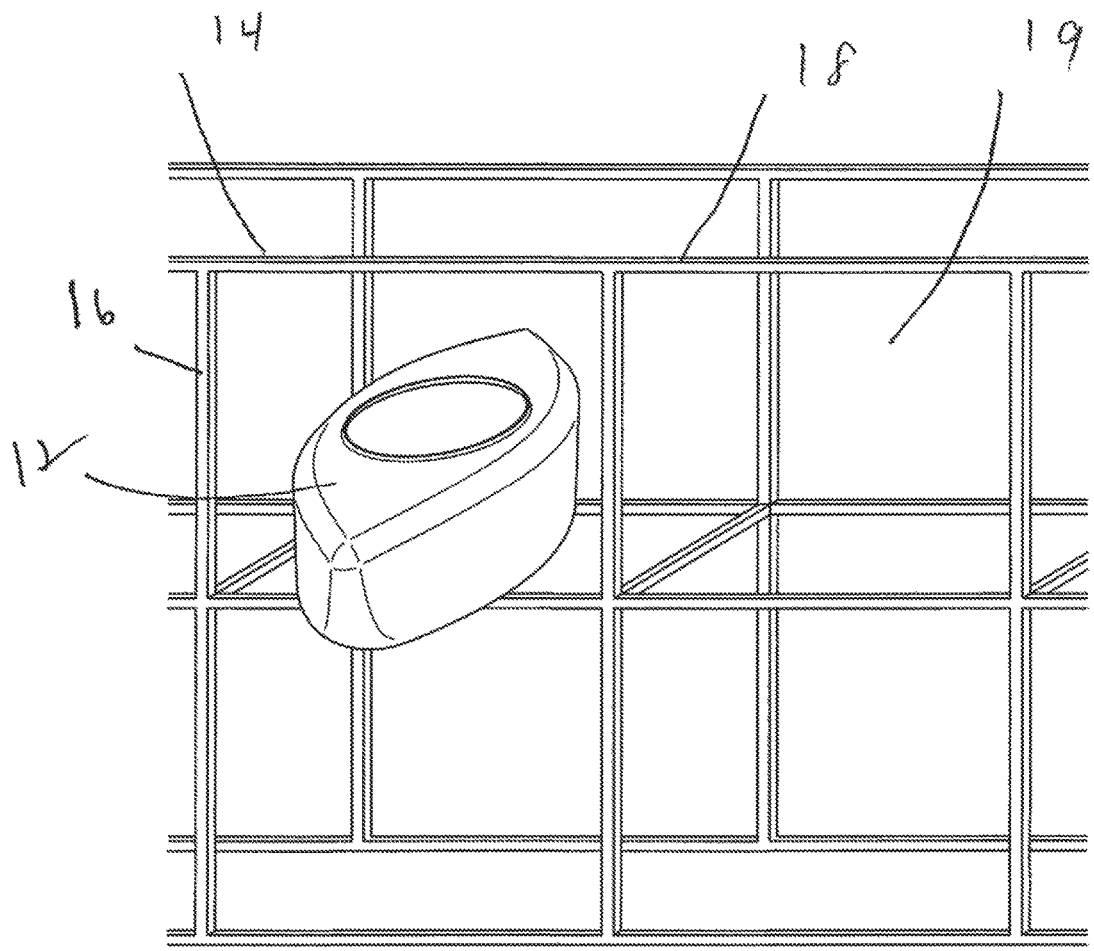
FIG. 1 is a schematic drawing of a typical prior art kayak rack.

The support structure can be a kayak rack 14 as shown in FIG. 1, the kayak rack 14 having general vertical supports 16 and horizontal beams 18 with slots 19 for the kayaks. As typical, there are at least two beams 18 for each kayak, each generally horizontal and parallel to a ground surface 20, each beam 18 having a longitudinal axis in a plane, the planes being substantially parallel to each other with the beams spaced apart by a distance less than the length of the vessel 12.

The support structure comprises a sliding structure 30 which comprising a bracket 32 having an upwardly facing surface 34 with a plurality of roller bearings 36 supported by and on the upwardly facing surface 34. The roller bearings are provided for ease in slidingly placing and removing the vessel from the support structure Typically, the bracket 32 is from about 16 to about 20 inches in length, and preferably about 18 inches in length, preferably there are about 5 to about 8 roller bearings (6 in the version shown), which can be from about 2 to about 3 inches spaced apart from each other, and 2⅝₁₆ inch apart in the version shown in the drawing.

Figure 2:
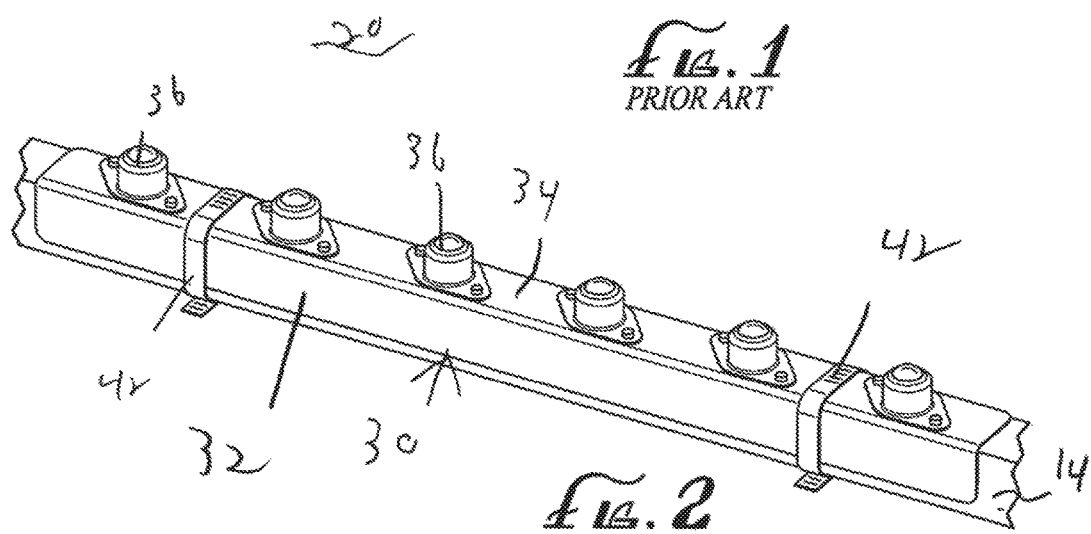
FIG. 2 is a perspective view of a sliding structure for use with a kayak rack.

Preferably the bracket 32 is an L-bracket as shown in FIG. 2, although it can be a U-bracket, or just a bar. The advantage of an L-bracket over a U-bracket is that it can be universal and does not have to be custom made for the particular width of the beam. An advantage of an L-bracket over a bar is that it provides sturdier support.

A fastener fastens the sliding structure on the beam. The fastener can be a hose clamp 42, and preferably at least two hose clamps 42, as shown in FIGS. 2 and 3. The fastener can be tie-ties or even duct tape. Optionally the bracket can have one or more openings, preferably at least two, on one of its faces, such as the upwardly facing surface, through which fasteners such as screws, tie-ties or bolts can be inserted into the beam or around the beam. Optionally both hose clamps and screws and/or bolts can be used.

It is also possible for the fastener to be a weld where the bracket is welded onto a beam or an adhesive such as an epoxy adhesive or a releasable adhesive. Combination of different fasteners can be used together.

An advantage of using the sliding structure as described is that it can be retrofitted to existing support structures.

A type of bearing that can be used are TruePower (trademark) ⅝" roller ball transfer bearing which can be screw mounted on the bracket or held in place by other techniques such as welding or adhesive or pop rivets. An optional bearing as shown in FIG. 5 can comprise a plastic housing 62 with a plastic or glass ball 63 retained in the housing, the housing including a support 66 to keep the ball from sliding out of the housing. Further support for the ball can be a plate 70, which can be made of metal, below the ball bearings.

The bracket is preferably made of a strong material such as a metal of aluminum or stainless steel or a structural plastic such as high density polyethylene, polyvinyl chloride, or ABS.

The support structure need not be a rack as shown in the FIGS. 1-3. The invention is useful for roof racks on vehicles, or incorporated into an add-on rack on a vehicle 80 such as shown in FIG. 4. The vehicle 80 has a width and length. In particular, a conventional bicycle rack 82 (available from Rhode Gear) is secured to the rear portion of the vehicle 80. The rack 82 has a pair of spaced apart pivoting arms 84 that extend rearwardly in relationship to the vehicle. The arms 84 are spaced apart, preferably a sufficient amount to adequately support the elongated base 88. A sliding structure 86 is secured to an elongated base 88 that extends laterally between the arms 84 and parallel to the vehicle width and proximate to the ends of the arms. The base 88 is secured to the arms by fasteners such as a strap, tie-ties or bands provided by the rack itself. The base can be removably secured to the arms. The base has an upper surface 90 on which is mounted the sliding structure 86, which can be the same as the sliding structure of FIGS. 2 and 3, such as a bracket with a plurality of bearings 36, the same bearings as used in the version of the invention shown in FIG. 2. The base 88 can be as simple as a block of wood as shown in FIG. 4, and can be made of materials other than wood such as plastic or metal. The cross-sectional shape of the base 88 need not be rectangular, as long as a surface is provided for the sliding structure to be mounted or attached in the same way the sliding structure of FIG. 2 is attached to a beam. The number of bearings and how they are spaced apart can be the same as the version of the invention shown in FIG. 2.

Optionally the bracket can be omitted with the bearings directly secured to the base.

Optionally the invention includes an arm 100 proximate to each end of the bracket, each arm 100 extending in a direction away from the longitudinal axis of the bracket. The arms prevent a vessel from sliding off of the sliding support to the side.

In use of the invention, a vessel is loaded onto a support structure (such as shown in the Figures such as a vehicle or kayak rack) or unloaded from a support structure comprising the step of sliding the vessel on the ball bearings.

Although the invention has been described with regard to preferred version thereof, other versions are possible. For example, other applications of the invention are possible. Broadly the invention comprises a device useful for loading, unloading, or both loading and unloading an article onto a structure, the device comprising:

(i) a bracket having an upwardly facing surface;
(ii) roller bearings on the upwardly facing surface of the bracket; and
(iii) a fastener for fastening the bracket to the structure.

For example, the article being loaded or unloaded need not be limited to vessels, but can be luggage, construction materials such as lumber or steel beams, and the like.

Therefore the spirit and scope of the appended claims should not be limited to the preferred versions described herein.

What is claimed is:

1. A support for a vessel comprising:
    a) a support structure supported by the ground, the support structure comprising a first beam for supporting the vessel, the beam generally parallel to the ground;
    b) a first sliding structure on the first beam comprising:
        (i) an L-bracket having an upwardly facing surface;
        (ii) a series of roller bearings on the upwardly facing surface of the bracket for ease in slidingly placing and removing the vessel from the support structure; and
    c) a fastener fastening the first sliding structure to the first beam with the roller bearings positioned for the vessel to slide on the bearings.
2. The support of claim 1 wherein the vessel is a kayak.
3. The support of claim 1 wherein the vessel is a canoe.
4. The support of claim 1 wherein the support structure is a rack comprising vertical supports and multiple beams and slots for multiple vessels.
5. The support of claim 1 wherein the support structure comprises a second beam having an upwardly facing surface, and a second sliding structure substantially the same as the first sliding structure, wherein the second sliding structure be on the upwardly facing surface of the second beam.
6. The support of claim 5 with a vessel on the first and second beams, the first and second beams being spaced apart a distance less than the length of the vessel.
7. The support of claim 1 wherein the fastener is a hose clamp.
8. The support of claim 1 wherein the bracket has at least two openings therethrough and the fastener comprises a screw or a bolt extending through each of the two openings into the first beam.
9. The support of claim 1 wherein the roller bearings comprise a housing and ball formed of plastic.
10. The support of claim 1 wherein the roller bearings comprise a ball formed of glass.

* * * * *